United States Patent
Snider et al.

(10) Patent No.: US 10,023,026 B2
(45) Date of Patent: Jul. 17, 2018

(54) VEHICLE REAR SLIDER WINDOW ASSEMBLY WITH ENHANCED RAIL ATTACHMENT

(71) Applicant: MAGNA MIRRORS OF AMERICA, INC., Holland, MI (US)

(72) Inventors: Darin J. Snider, Holland, MI (US); David K. Johnson, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 5 days.

(21) Appl. No.: 15/352,799

(22) Filed: Nov. 16, 2016

(65) Prior Publication Data
US 2017/0144511 A1 May 25, 2017

Related U.S. Application Data

(60) Provisional application No. 62/258,056, filed on Nov. 20, 2015.

(51) Int. Cl.
*B60J 1/18* (2006.01)
*E05D 15/06* (2006.01)

(52) U.S. Cl.
CPC ........ *B60J 1/1853* (2013.01); *E05D 15/0621* (2013.01); *E05Y 2900/55* (2013.01)

(58) Field of Classification Search
CPC ... B60J 1/1853; B60J 1/007; B60J 1/16; B60J 10/74; E05Y 2900/55; E05D 15/062; E06B 3/4618
See application file for complete search history.

(56) References Cited

U.S. PATENT DOCUMENTS

| | | |
|---|---|---|
| 2,762,675 A | 9/1956 | Janows |
| 2,858,408 A | 10/1958 | Barroero |
| 2,912,714 A | 11/1959 | Rich |
| 2,962,773 A | 12/1960 | Heller |
| 3,177,989 A | 4/1965 | Di Chiaro |
| 3,237,250 A | 3/1966 | Scoville |
| 3,379,859 A | 4/1968 | Marriott |
| 3,508,361 A | 4/1970 | Ryder |
| 3,715,707 A | 2/1973 | Anderson |
| 3,893,260 A | 7/1975 | Cadiou |
| 3,898,427 A | 8/1975 | Levin et al. |
| 3,911,245 A | 10/1975 | O'Shaughnessy |
| 3,964,068 A | 6/1976 | Torii et al. |
| 3,995,142 A | 11/1976 | Ciardelli et al. |

(Continued)

*Primary Examiner* — Justin B Rephann
(74) *Attorney, Agent, or Firm* — Honigman Miller Schwartz and Cohn, LLP (57) ABSTRACT

A slider window assembly for a vehicle includes at least one fixed window panel and a frame portion attached at the at least one fixed window panel. A movable window panel is movable along upper and lower rails of the frame portion and movable between a closed position and an opened position. At least one of the upper and lower rails includes a recess for receiving adhesive therein and a tapered end region at an end of the recess. The tapered end region includes at least one notch or groove through a wall that at least partially circumscribes the recess, with the notch or groove configured to allow excess adhesive to escape during the adhesive bonding of the at least one of the upper and lower rails to the at least one fixed window panel. The tapered end region has an outer tapered surface opposite the recess.

20 Claims, 5 Drawing Sheets

(56) References Cited

U.S. PATENT DOCUMENTS

| | | | |
|---|---|---|---|
| 4,065,848 A | 1/1978 | Dery | |
| 4,081,926 A | 4/1978 | Jardin | |
| 4,124,054 A | 11/1978 | Spretnjak | |
| 4,137,447 A | 1/1979 | Boaz | |
| 4,158,270 A | 6/1979 | Cherbourg et al. | |
| 4,171,594 A | 10/1979 | Colanzi | |
| 4,244,774 A | 1/1981 | Dery | |
| 4,388,522 A | 6/1983 | Boaz | |
| 4,410,843 A | 10/1983 | Sauer et al. | |
| 4,415,196 A | 11/1983 | Baum et al. | |
| 4,450,346 A | 5/1984 | Boaz | |
| 4,458,445 A | 7/1984 | Sauer et al. | |
| 4,519,443 A | 5/1985 | Sutoh et al. | |
| 4,552,611 A | 11/1985 | Dery et al. | |
| 4,606,159 A | 8/1986 | Kunert | |
| 4,611,849 A | 9/1986 | Trenker | |
| 4,635,398 A | 1/1987 | Nakamura | |
| 4,674,231 A | 6/1987 | Radek et al. | |
| 4,738,052 A | 4/1988 | Yoshida | |
| 4,723,809 A | 9/1988 | Kida et al. | |
| 4,785,583 A | 11/1988 | Kawagoe et al. | |
| 4,853,055 A * | 8/1989 | Taylor | B60J 10/70 156/108 |
| 4,883,940 A | 11/1989 | Tokarz | |
| 4,920,698 A | 5/1990 | Friese et al. | |
| 4,934,098 A | 6/1990 | Prouteau et al. | |
| 4,970,911 A | 11/1990 | Ujihara et al. | |
| 4,987,699 A * | 1/1991 | Gold | B60J 1/17 156/107 |
| 4,995,195 A | 2/1991 | Olberding et al. | |
| 5,046,283 A | 9/1991 | Compeau et al. | |
| 5,146,712 A | 9/1992 | Hlavaty | |
| 5,228,740 A | 7/1993 | Saltzman | |
| 5,245,788 A | 9/1993 | Riegelman | |
| 5,294,168 A | 3/1994 | Kronbetter | |
| 5,308,247 A | 5/1994 | Dyrdek | |
| 5,333,411 A | 8/1994 | Tschirschwitz et al. | |
| 5,345,717 A | 9/1994 | Mori et al. | |
| 5,363,596 A | 11/1994 | Kronbetter | |
| 5,367,827 A | 11/1994 | Taijima et al. | |
| 5,442,880 A | 8/1995 | Gipson | |
| 5,466,911 A | 11/1995 | Spagnoli et al. | |
| 5,467,560 A | 11/1995 | Camp et al. | |
| 5,473,840 A | 12/1995 | Gillen et al. | |
| 5,505,023 A | 4/1996 | Gillen et al. | |
| 5,522,191 A | 6/1996 | Wenner et al. | |
| 5,525,401 A | 6/1996 | Hirmer | |
| 5,531,046 A | 7/1996 | Kollar et al. | |
| 5,542,214 A | 8/1996 | Buening | |
| 5,551,197 A | 9/1996 | Repp | |
| 5,572,376 A | 11/1996 | Pace | |
| 5,613,323 A | 3/1997 | Buening | |
| 5,617,675 A | 4/1997 | Kobrehel | |
| 5,711,112 A | 1/1998 | Barten et al. | |
| 5,716,536 A | 2/1998 | Yokoto et al. | |
| 5,724,769 A | 3/1998 | Cripe et al. | |
| 5,724,771 A | 3/1998 | Gipson | |
| 5,784,833 A | 7/1998 | Sponable et al. | |
| 5,799,444 A | 9/1998 | Freimark et al. | |
| 5,799,449 A | 9/1998 | Lyons et al. | |
| 5,822,922 A | 10/1998 | Grumm et al. | |
| 5,836,110 A | 11/1998 | Buening | |
| 5,853,895 A | 12/1998 | Lewno | |
| 5,890,321 A | 4/1999 | Staser et al. | |
| 5,953,887 A | 9/1999 | Lucas et al. | |
| 5,996,284 A | 12/1999 | Freimark et al. | |
| 5,997,793 A | 12/1999 | Lahnala | |
| 6,014,840 A | 1/2000 | Ray et al. | |
| 6,026,611 A | 2/2000 | Ralston et al. | |
| 6,038,819 A | 3/2000 | Klein | |
| 6,086,138 A | 7/2000 | Xu et al. | |
| 6,112,462 A | 9/2000 | Kolar | |
| 6,119,401 A | 9/2000 | Lin et al. | |
| 6,119,402 A | 9/2000 | Wisner | |
| 6,125,585 A | 10/2000 | Koneval et al. | |
| 6,161,894 A | 12/2000 | Chapman | |
| 6,223,470 B1 | 5/2001 | Millard et al. | |
| 6,225,904 B1 | 5/2001 | Jaffe et al. | |
| 6,293,609 B1 | 9/2001 | Xu et al. | |
| 6,324,788 B1 | 12/2001 | Koneval et al. | |
| 6,328,243 B1 | 12/2001 | Yamamoto | |
| 6,490,832 B1 | 12/2002 | Fischbach et al. | |
| 6,525,659 B2 | 2/2003 | Jaffe et al. | |
| 6,591,552 B1 | 7/2003 | Rasmussen | |
| 6,598,931 B2 | 7/2003 | Tamura | |
| 6,691,464 B2 | 2/2004 | Nestell et al. | |
| 6,742,819 B2 | 6/2004 | So et al. | |
| 6,766,617 B2 | 7/2004 | Purcell | |
| 6,955,009 B2 | 10/2005 | Rasmussen | |
| 7,003,916 B2 | 2/2006 | Nestell et al. | |
| 7,010,883 B2 | 3/2006 | Jaerpsten et al. | |
| 7,051,478 B2 | 5/2006 | Bourque et al. | |
| 7,073,293 B2 | 7/2006 | Galer | |
| 7,155,863 B2 | 1/2007 | Daniel et al. | |
| 7,184,190 B2 | 2/2007 | McCabe et al. | |
| 7,186,118 B2 | 3/2007 | Hansen et al. | |
| 7,219,470 B2 | 5/2007 | Lahnala | |
| 7,255,451 B2 | 8/2007 | McCabe et al. | |
| 7,259,359 B2 | 8/2007 | Davey et al. | |
| 7,395,631 B2 | 7/2008 | Lahnala | |
| 7,400,435 B2 | 7/2008 | Byers et al. | |
| 7,437,852 B2 | 10/2008 | Dufour et al. | |
| 7,608,949 B2 | 10/2009 | Busch | |
| 7,626,749 B2 | 12/2009 | Baur et al. | |
| RE41,502 E | 8/2010 | Neaux et al. | |
| 7,871,272 B2 | 1/2011 | Firman et al. | |
| 7,900,863 B1 | 3/2011 | Cheng | |
| 7,934,342 B2 | 5/2011 | Lahnala | |
| 7,963,070 B2 | 6/2011 | Recker | |
| 8,023,008 B2 | 9/2011 | Okuno | |
| 8,042,664 B2 | 10/2011 | Rutkowski et al. | |
| 8,069,615 B2 | 12/2011 | Heiman et al. | |
| 8,127,498 B2 | 3/2012 | Lahnala | |
| 8,151,519 B2 | 4/2012 | Bello et al. | |
| 8,250,812 B2 | 8/2012 | Hebert et al. | |
| 8,272,168 B2 | 9/2012 | Lahnala | |
| 8,402,695 B2 | 3/2013 | Smith et al. | |
| 8,881,458 B2 | 11/2014 | Snider et al. | |
| 8,915,018 B2 | 12/2014 | Snider | |
| 2003/0074842 A1 | 4/2003 | Eckhardt et al. | |
| 2003/0140562 A1 | 7/2003 | Staser et al. | |
| 2003/0188487 A1 | 10/2003 | Rasmussen | |
| 2003/0188490 A1 | 10/2003 | Kraus et al. | |
| 2003/0213179 A1 | 11/2003 | Galer | |
| 2004/0020131 A1 | 2/2004 | Galer et al. | |
| 2004/0065017 A1 | 4/2004 | Priest et al. | |
| 2004/0065018 A1 | 4/2004 | Reginier et al. | |
| 2005/0073172 A1* | 4/2005 | Weinert | B60J 1/1853 296/146.16 |
| 2005/0150170 A1* | 7/2005 | Lahnala | B60J 1/1853 49/413 |
| 2006/0032140 A1 | 2/2006 | Arimoto et al. | |
| 2006/0061008 A1 | 3/2006 | Karner et al. | |
| 2006/0107600 A1 | 5/2006 | Nestell et al. | |
| 2006/0130405 A1 | 6/2006 | Hemond et al. | |
| 2007/0157522 A1* | 7/2007 | Hebert | B60J 1/1853 49/413 |
| 2007/0209283 A1 | 9/2007 | Ostrowski et al. | |
| 2007/0277443 A1 | 12/2007 | Dery et al. | |
| 2008/0122262 A1 | 5/2008 | Cicala | |
| 2008/0127563 A1 | 6/2008 | Tooker | |
| 2008/0155902 A1 | 7/2008 | Kaiser | |
| 2008/0196816 A1* | 8/2008 | Lewno | B32B 17/10036 156/99 |
| 2008/0202032 A1 | 8/2008 | Loidolt | |
| 2009/0322705 A1 | 12/2009 | Halsey, IV | |
| 2010/0146859 A1 | 6/2010 | Gipson et al. | |
| 2010/0154312 A1 | 6/2010 | Gipson et al. | |
| 2010/0182143 A1 | 7/2010 | Lynam | |
| 2010/0240229 A1 | 9/2010 | Firman et al. | |
| 2010/0263290 A1 | 10/2010 | Pawloski et al. | |
| 2011/0030276 A1 | 2/2011 | Smith et al. | |
| 2011/0233182 A1 | 9/2011 | Baranski | |
| 2012/0117880 A1 | 3/2012 | Lahnala et al. | |

(56) References Cited

U.S. PATENT DOCUMENTS

| | | |
|---|---|---|
| 2012/0091113 A1 | 4/2012 | Bennett et al. |
| 2012/0091114 A1 | 4/2012 | Ackerman et al. |
| 2012/0139289 A1 | 6/2012 | Lahnala |
| 2013/0255156 A1* | 10/2013 | Snider ................... B60J 1/1853 49/130 |
| 2013/0277352 A1 | 10/2013 | Degen et al. |
| 2013/0283693 A1* | 10/2013 | Huizen ................ E05F 11/488 49/123 |
| 2014/0047772 A1 | 2/2014 | Hulst |
| 2014/0091074 A1 | 4/2014 | Lisinski et al. |
| 2014/0230333 A1* | 8/2014 | Lahnala ................ B60J 1/1853 49/408 |
| 2015/0101254 A1 | 4/2015 | Tooker et al. |
| 2015/0167372 A1* | 6/2015 | Hulst ................... B60J 1/1853 49/123 |

\* cited by examiner

VEHICLE REAR SLIDER WINDOW ASSEMBLY WITH ENHANCED RAIL ATTACHMENT

CROSS REFERENCE TO RELATED APPLICATION

The present application claims the filing benefits of U.S. provisional application Ser. No. 62/258,056, filed Nov. 20, 2015, which is hereby incorporated herein by reference in its entirety.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails that may be adhesively bonded at the surface of the fixed window panels. The slidable window panel may be moved along the rails to open and close the window. The slidable window panel may be driven or moved by a cable drive system.

SUMMARY OF THE INVENTION

The present invention provides a rear slider window assembly that has upper and lower rails or channels adhesively bonded at the inter surface of the fixed window panel or panels. The rails include one or more notches at the ends thereof that allows the adhesive to squeeze through the notches during the assembly of the rails to the glass panels. The notches provide for enhanced bonding of the rails to the glass panels.

According to an aspect of the present invention, a rear slider window assembly of a vehicle (such as a pickup truck or the like) includes a frame portion having an upper rail and a lower rail. First and second spaced apart fixed window panels (or a single fixed window panel with an aperture formed therethrough) are fixed relative to the frame portion and define or establish an opening therebetween. A movable window panel is movable along the upper and lower rails and is movable between a closed position, where the movable window panel is disposed at the opening, and an opened position, where the movable window panel is disposed at least partially along the first fixed window panel. One or both of the upper and lower rails includes a recess for receiving adhesive therein and includes a tapered end region at an end of the recess. The tapered end region comprises at least one notch or groove through a wall that at least partially circumscribes the recess, and the notch or groove is configured to allow excess adhesive to escape during the adhesive bonding of the respective rail to the fixed window panel or panels. The tapered end region has an outer tapered surface opposite the recess. The tapered end region may also include an aperture therethrough that is configured to allow excess adhesive to escape during the adhesive bonding of the rail to the fixed window panel or panels.

Therefore, the present invention provides enhanced assembly or bonding of the upper and/or lower rails to the fixed window panel or panels. The notches or grooves and/or aperture allow for excess adhesive to escape in a controlled manner from the recesses during the adhesive bonding or attachment of the upper and/or lower rails to the window panel or panels (such as when an operator or automated device places and presses the rail at the fixed window panel or panels during manufacture of the window assembly). The ramped outer surface tapers or narrows toward the window panel surface such that the adhesive may be readily wiped (by the operator or by an automated device) from the tapered end portion and wiped off of the window panel in a single swiping motion.

These and other objects, advantages, purposes and features of the present invention will become apparent upon review of the following specification in conjunction with the drawings.

DESCRIPTION OF THE PREFERRED EMBODIMENTS

Figure 1:
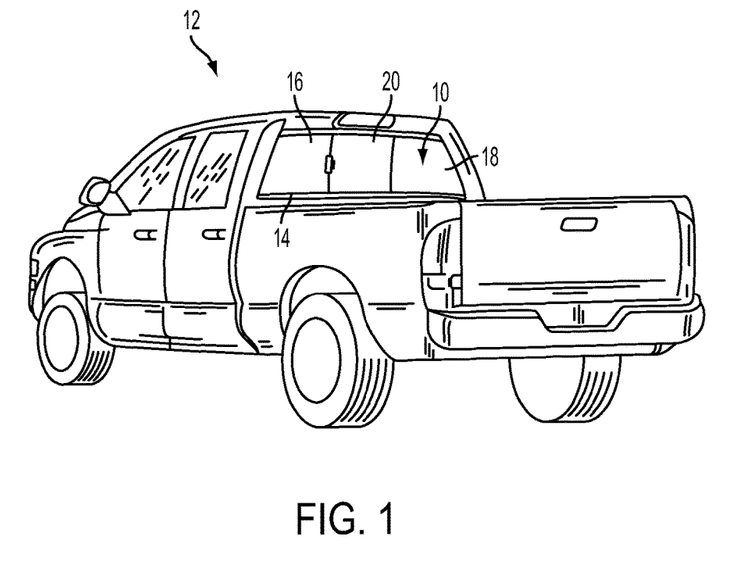
FIG. 1 is a rear perspective view of a pickup truck having a rear slider window assembly in accordance with the present invention.
Figure 2:
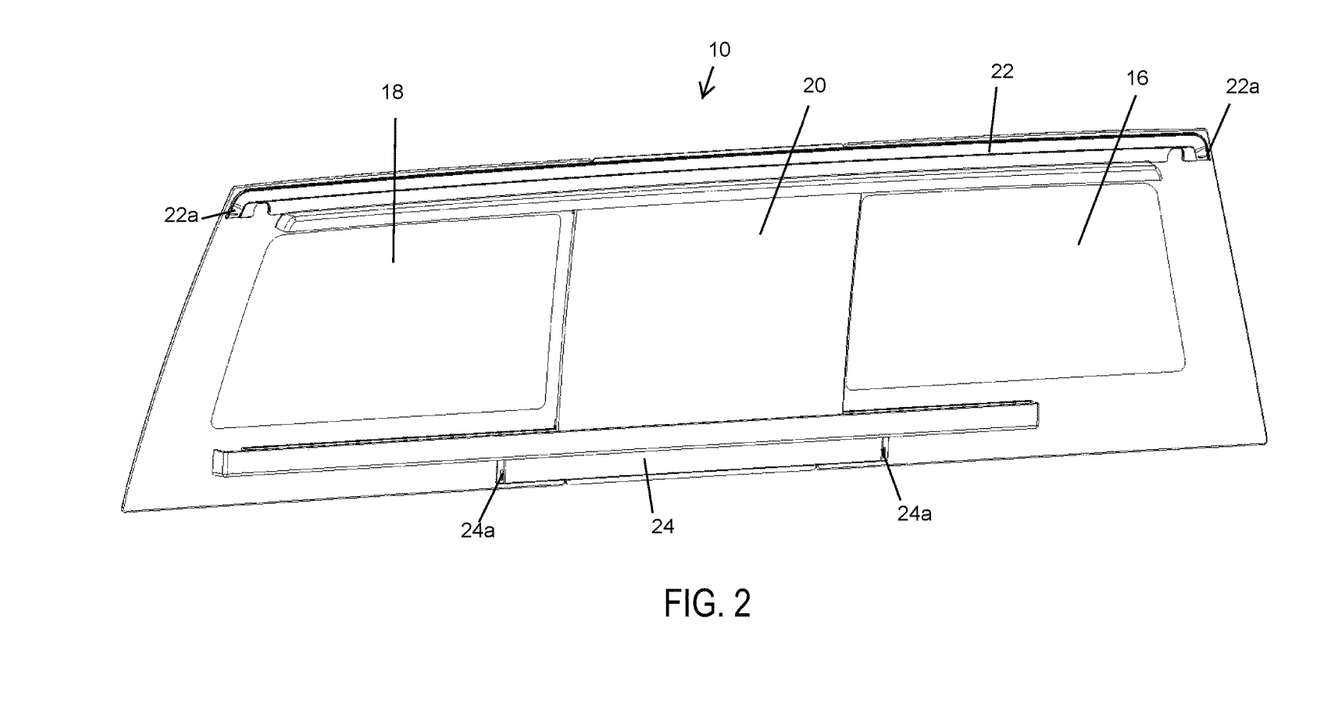
FIG. 2 is a perspective view of the rear slider window assembly having upper and lower rails bonded at the glass panels in accordance with the present invention.
Figure 3:
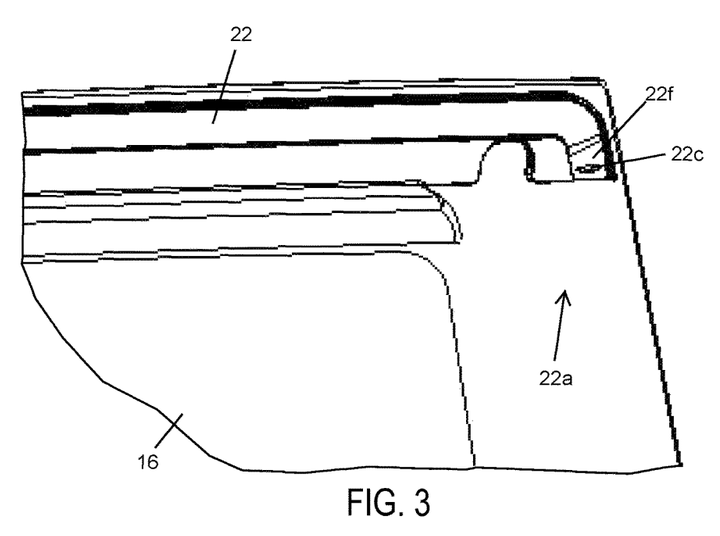
FIG. 3 is an enlarged perspective view of an upper corner region of the rear slider window assembly of FIG. 2.
Figure 4:
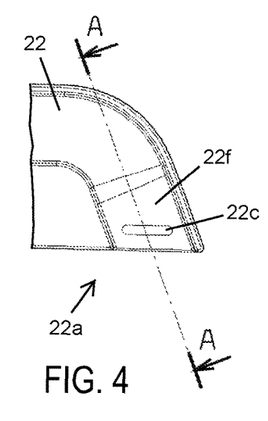
FIG. 4 is a plan view of the upper corner region of the rear slider window assembly of FIG. 3.
Figure 4A:
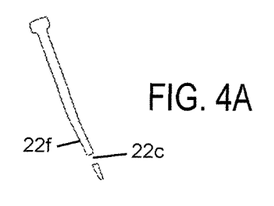
FIG. 4A is a sectional view of the upper rail taken along the line A-A in FIG. 4.
Figure 5:
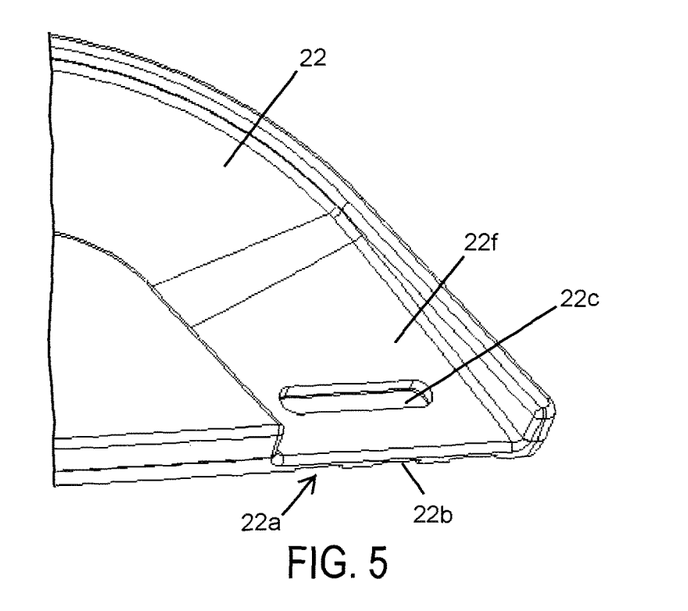
FIG. 5 is another enlarged perspective view of the upper rail of the rear slider window assembly of the present invention.

Referring now to the drawings and the illustrative embodiments depicted therein, a rear slider window assembly 10 of a vehicle 12 (such as a pickup truck or the like) includes a pair fixed window panels 16, 18 (or a single fixed window panel) having an opening established therebetween or therethrough, and a movable window panel 20 that is movable relative to a frame or rails 22, 24 and fixed window panels 16, 18 between an opened position and a closed position (FIGS. 1-3). The rails include an upper rail 22 and a lower rail 24, with the upper and lower edge regions of movable window panel 20 (FIG. 1) movably or slidably received in and along the respective upper and lower rails 22, 24. The upper and lower rails 22, 24 include ramped or tapered ends 22a, 24a and notches 22b, 24b and apertures 22c, 24c at their ramped ends, as discussed below. The notches and apertures allow for excess adhesive to escape during the assembly process and provides for enhanced assembly processing and enhanced bonding of the rails to the fixed window panels, as also discussed below.

Optionally, and as shown in the illustrated embodiment, the window assembly may comprise two fixed window panels or panel portions that are spaced apart so as to define an opening therebetween (and with upper and lower appliqués or trim or filler panels or elements disposed at the upper and lower regions of the opening and between the fixed window panels). Optionally, the window assembly may comprise a hole-in-glass window configuration, where the single fixed glass panel has an aperture or hole or opening established therethrough to define separate spaced apart fixed window panels or panel portions. The window assembly may utilize aspects of the window assemblies described in U.S. Pat. Nos. 8,915,018 and/or U.S. Pat. No. 8,881,458, and/or such as described in U.S. Publication No. US-2003-0213179, and/or such as described in RE41502, which are all hereby incorporated herein by reference in their entireties.

Upper and lower rails 22, 24 may comprise any suitable channel or rail element configured to slidably receive an upper or lower edge portion of the movable window panel. Slider or movable window panel 20 is movable along lower rail 24 and upper rail 22 of frame portion 14 to open and close the aperture or opening, such as in a manner similar to known slider window assemblies. The movable window panel 20 may include or may be disposed at a lower carrier, which may receive the lower perimeter edge region of the slider window panel 20 therein and is slidably or movably received in the channel portion of the lower rail 24 of frame portion 14.

Figure 6:
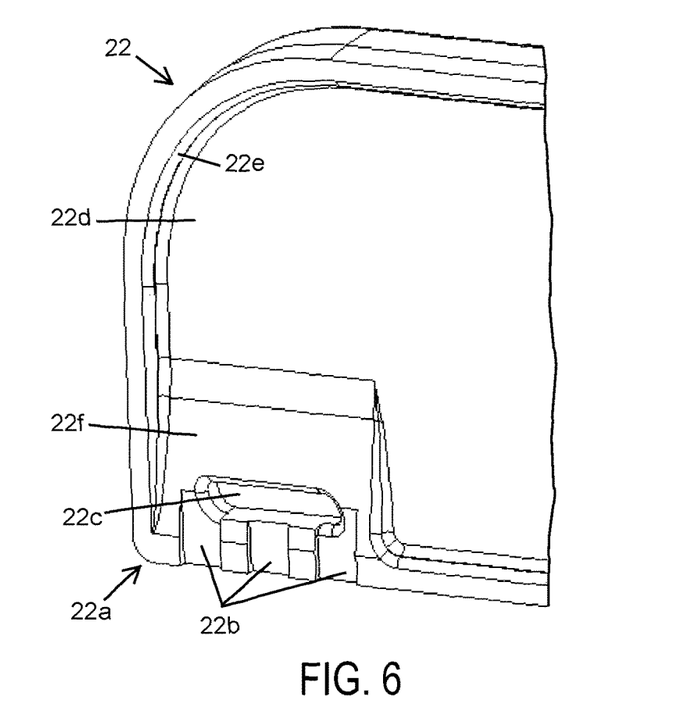
FIG. 6 is an enlarged perspective view of the bonding side of the upper rail of FIG. 5.

As shown in FIG. 6, the upper rail 22 includes a recess or channel 22d at its window facing side or surface and includes side walls 22e surrounding or circumscribing and defining the recess 22d. The recess 22d is configured to receive adhesive (such as uncured liquid adhesive, such as a urethane adhesive or the like) therein for adhesively bonding the upper rail 22 at the fixed window panels 16, 18 (and at the upper appliqué between the fixed window panels) and the walls 22e set or establish the bond-line thickness of the adhesive that bonds the rail at the window panel or panels. Thus, when the adhesive is disposed along and in the recess of the upper rail, the upper rail is pressed against the window surface, with the walls 22e engaging the window surface and the adhesive bonding the rail to the window.

As shown in FIGS. 2-6, the opposite end regions 22a of the upper rail 22 include a tapered portion 22f (where the height of the rail tapers or reduces such that the outer surface of the rail tapers toward the window surface). The end of the tapered end region 22a includes the notches 22b (such as one or more notches, such as three notches as shown in FIG. 6) through the end wall at the end of the recess to provide notches or channels for fluid passage from the recess to exterior of the rail when the rail is attached at the window panel. The end of the tapered end region 22a also includes an aperture 22c to allow fluid passage from the recess to exterior of the rail when the rail is attached at the window panel. As shown in FIG. 6, the notches 22b are established at the end of the tapered portion 22f and allow excess adhesive to escape from the recess 22d as the upper rail 22 (with adhesive dispensed at the recess 22d) is pressed against the window panel or panels. The aperture 22c is also established at the tapered portion 22f to further enhance adhesive escaping from the recess during the adhesive bonding attachment process.

The end regions are tapered so that, after the upper rail is pressed against the window panel or panels, and after excess adhesive escapes through the aperture 22c and/or notches or grooves 22b, the operator may simply wipe (such as with a rubber or flexible or resilient element or a cloth or brush or foam pad or the like) along the tapered end portions 22f to remove the excess escaping adhesive from the upper rail 22 and from the window panel or panels, without leaving excess adhesive at the window panel surface adjacent the ends of the upper rail.

Similarly, and such as shown in FIGS. 2 and 7-9A, the lower rail 24 includes a recess 24d at its window facing side and includes side walls 24e surrounding or circumscribing and defining the recess 24d. The recess 24d is configured to receive adhesive (such as uncured liquid adhesive, such as a urethane adhesive or the like) therein for adhesively bonding the lower rail 24 at the fixed window panels 16, 18 (and at the lower appliqué between the fixed window panels) and the walls 24e set or establish the bond-line thickness of the adhesive that bonds the rail at the window panel or panels. Thus, when the adhesive is disposed along and in the recess of the lower rail, the lower rail is pressed against the window surface, with the walls 24e engaging the window surface and the adhesive bonding the rail to the window.

Figure 7:
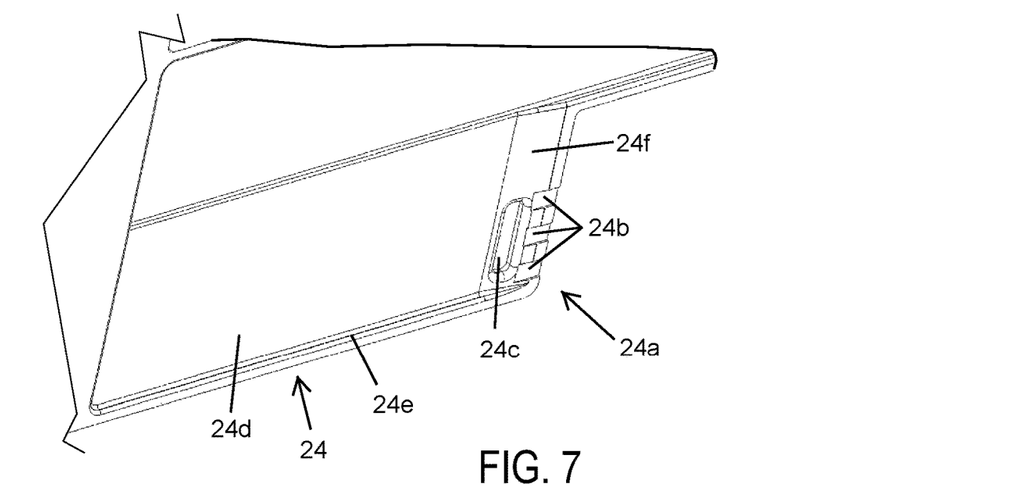
FIG. 7 is an enlarged perspective view of a portion of the lower rail of the rear slider window assembly of the present invention.
Figure 8:
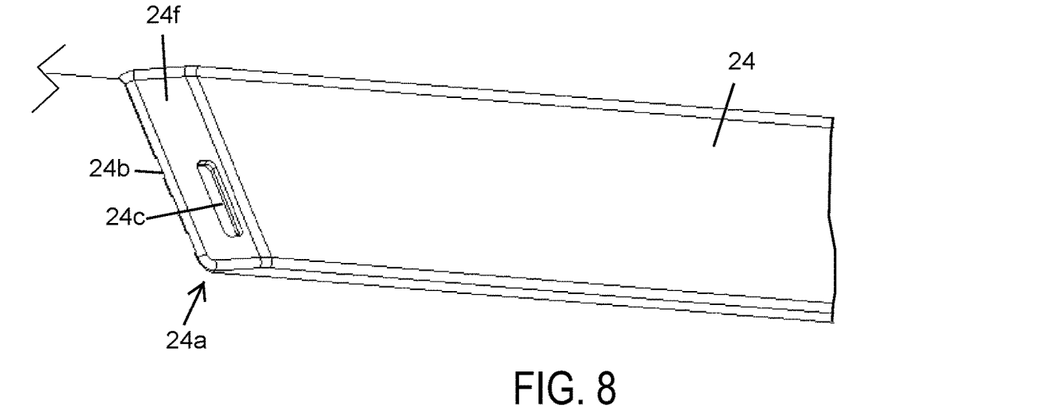
FIG. 8 is an enlarged perspective view of another portion of the lower rail of the rear slider window assembly of the present invention.
Figures 9, 9A:
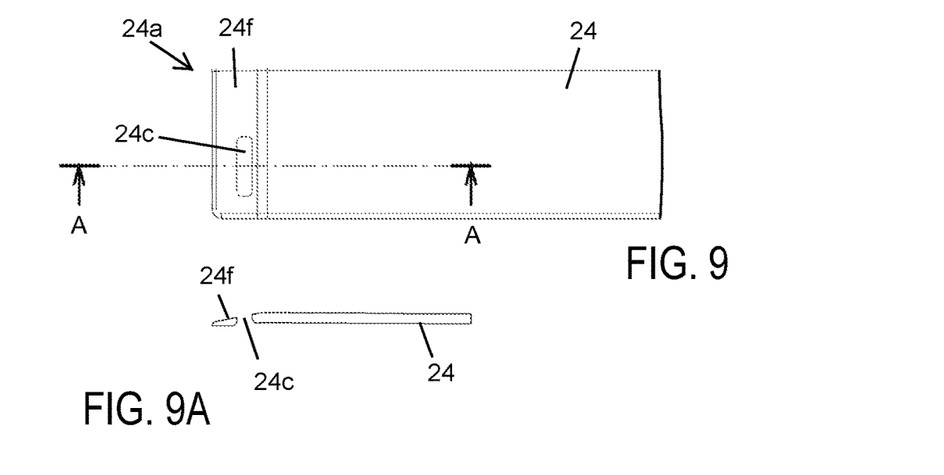
FIG. 9 is a plan view of the portion of the lower rail of FIG. 8.
FIG. 9A is a sectional view of the lower rail taken along the line A-A in FIG. 9.

As shown in FIGS. 2-6, the end regions 24a of the lower rail 24 include a tapered portion 24f (where the height of the rail tapers or reduces such that the outer surface of the rail tapers toward the window surface). The end of the tapered end region 24a includes the notches 24b (such as one or more notches, such as three notches as shown in FIG. 7) through the end wall at the end of the recess to provide notches or channels for fluid passage from the recess to exterior of the rail when the rail is attached at the window panel. The end of the tapered end region 24a also includes an aperture 24c to allow fluid passage from the recess to exterior of the rail when the rail is attached at the window panel. As best shown in FIG. 7, the notches 24b are established at the end of the tapered portion 24f and allow excess adhesive to escape from the recess 24d as the lower rail 24 (with adhesive dispensed at the recess 24d) is pressed against the window panel or panels. The aperture 24c is also established at the tapered portion 24f to further enhance adhesive escaping from the recess during the adhesive bonding attachment process.

The end regions are tapered so that, after the lower rail is pressed against the window panel or panels, and excess adhesive escapes through the aperture 24c and/or notches or grooves 24b, the operator may simply wipe (such as with a rubber or flexible or resilient element or a cloth or brush or foam pad or the like) along the tapered end portions 24f to remove the excess escaping adhesive from the lower rail 24 and from the window panel or panels, without leaving excess adhesive at the window panel surface adjacent the ends of the lower rail.

Therefore, the present invention provides enhanced assembly or bonding of the upper and lower rails to the fixed window panel or panels. The notches or grooves and aperture allow for excess adhesive to escape in a controlled manner from the recess during the adhesive bonding or attachment of the upper and lower rails to the window panel or panels. The ramped outer surface tapers or narrows toward the window panel surface such that the adhesive may be readily wiped from the tapered end portion and wiped off of the window panel in a single swiping motion.

The upper and lower rails may comprise any suitable channel element configured to slidably receive the movable window panel and may be formed via any suitable forming means. For example, the channel portions and rails may be formed via an injection molding process. The rails may comprise any suitable material or materials, such as, for example, a rigid or substantially rigid molded polymeric material (such as a polyvinylchloride material or PC-ABS or the like), and preferably a rigid polymeric material or engineered plastic material. The rails may be adhered or bonded to the respective window panels and/or sheet metal via any suitable adhesive, such as, for example, by utilizing aspects of the window assemblies described in U.S. Pat. Nos. 5,551,197 and 5,853,895, which are hereby incorporated herein by reference in their entireties.

The movable window panel may be movable between its opened and closed positions via any suitable means, such as via manual pushing or pulling at the window panel and/or in response to actuation of a drive motor of a drive motor assembly or system, which may move cables or wires of cable assemblies relative to a sheath of the cable assemblies or the like to impart horizontal movement of the slider window panel 20 along the rails 22, 24. Optionally, the drive motor assembly may utilize aspects of the drive assemblies of the types described in U.S. Pat. Nos. 4,920,698; 4,995,195; 5,146,712; 5,531,046; 5,572,376; 6,955,009 and/or U.S. Pat. No. 7,073,293, and/or U.S. Publication Nos. US-2004-0020131 and/or US-2008-0127563, which are all hereby incorporated herein by reference in their entireties.

The benefits of embodiments of the slider window assembly of the present invention may also be realized in vehicular movable window assemblies other than a rear slider window assembly for a pickup truck or the like, such as (for example) a slider window assembly suitable for use as a movable side window for a vehicle such as a van or a bus. The window assembly may utilize aspects of the elements and window assemblies described in U.S. Pat. Nos. 8,915,018 and/or U.S. Pat. No. 8,881,458, which are hereby incorporated herein by reference in their entireties.

Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

Optionally, the fixed window panel and movable window panel of the window assembly of the present invention may include one or more electrically conductive elements, such as heater grids or the like, which may be powered utilizing aspects of the window assemblies described in U.S. Pat. Nos. 8,402,695 and/or U.S. Pat. No. 8,881,458, which are hereby incorporated herein by reference in their entireties. The window assembly may include a heater grid on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions, such as by utilizing aspects of the window assemblies described in U.S. Pat. No. 8,402,695 and/or U.S. Pat. No. 8,881,458, incorporated above.

Optionally, the window assembly or assemblies of the present invention may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or U.S. Pat. No. 6,691,464, and/or U.S. Publication Nos. US-2014-0047772; US-2006-0107600; US-2008-0127563; US-2004-0020131 and/or US-2003-0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A slider window assembly for a vehicle, said slider window assembly comprising:
at least one fixed window panel, said at least one fixed window panel defining an opening;
an upper rail and a lower rail attached at said at least one fixed window panel;
a movable window panel that is movable along said upper rail and said lower rail, wherein said movable window panel is movable between a closed position, where said movable window panel is disposed at said opening, and an opened position, where said movable window panel is disposed at least partially along said at least one fixed window panel;
wherein at least one of said upper and lower rails comprises a recess for receiving adhesive therein, and wherein said recess is established along an attaching surface of said at least one of said upper and lower rails with a wall of said at least one of said upper and lower rails at least partially circumscribing said recess, and wherein said at least one of said upper and lower rails comprises a tapered end region at an end of said recess, and wherein said tapered end region comprises at least one notch through said wall that at least partially circumscribes said recess;
wherein said at least one of said upper and lower rails is adhesively attached at said at least one fixed window panel via adhesive disposed at and along said recess;
wherein said at least one notch is configured to allow excess adhesive to escape during the adhesive bonding of said at least one of said upper and lower rails to said at least one fixed window panel; and
wherein said tapered end region has an outer tapered surface opposite said recess.

2. The slider window assembly of claim 1, wherein said upper rail comprises said recess for receiving adhesive therein, and wherein said upper rail comprises said tapered end region at the end of said recess, and wherein said at least one notch is configured to allow excess adhesive to escape during the adhesive bonding of said upper rail to said at least one fixed window panel.

3. The slider window assembly of claim 2, wherein said tapered end region comprises an aperture therethrough, and wherein said aperture is configured to allow excess adhesive to escape during the adhesive bonding of said upper rail to said at least one fixed window panel.

4. The slider window assembly of claim 2, wherein said upper rail comprises a plurality of recesses, and wherein said upper rail comprises said tapered end region at an end of at least some of said recesses.

5. The slider window assembly of claim 1, wherein said lower rail comprises said recess for receiving adhesive therein, and wherein said lower rail comprises said tapered end region at an end of said recess, and wherein said at least one notch is configured to allow excess adhesive to escape during the adhesive bonding of said lower rail to said at least one fixed window panel.

6. The slider window assembly of claim 5, wherein said tapered end region comprises an aperture therethrough, and wherein said aperture is configured to allow excess adhesive to escape during the adhesive bonding of said lower rail to said at least one fixed window panel.

7. The slider window assembly of claim 5, wherein said lower rail comprises a plurality of recesses, and wherein said lower rail comprises said tapered end region at an end of at least some of said recesses.

8. The slider window assembly of claim 5, wherein said upper rail comprises another recess for receiving adhesive therein, and wherein said upper rail comprises another tapered end region at an end of the other recess, and wherein at least one other notch is configured to allow excess adhesive to escape during the adhesive bonding of said upper rail to said at least one fixed window panel.

9. The slider window assembly of claim 1, wherein said at least one fixed window panel comprises a single fixed window panel having an opening therethrough.

10. The slider window assembly of claim 1, wherein said at least one fixed window panel comprises first and second fixed window panels defining an opening therebetween.

11. A method of manufacturing a slider window assembly, said method comprising:
providing an upper rail and a lower rail, wherein at least one of said upper and lower rails comprises a recess established along an attaching surface of said at least one of said upper and lower rails with a wall of said at least one of said upper and lower rails at least partially circumscribing said recess, and wherein said at least one of said upper and lower rails comprises a tapered end region at an end of said recess, and wherein said tapered end region comprises at least one notch through said wall that at least partially circumscribes said recess, and wherein said tapered end region has an outer tapered surface opposite said recess;
providing at least one fixed window panel defining an opening;
providing a movable window panel;
dispensing adhesive at and at least partially along said recess of said at least one of said upper and lower rails;
placing said at least one of said upper and lower rails, with said adhesive at said recess, at said at least one fixed window panel, whereby excess adhesive flows through said at least one notch of said wall and between said at least one fixed window panel and said at least one of said upper and lower rails during the adhesive bonding of said at least one of said upper and lower rails to said at least one fixed window panel; and
wiping excess adhesive from said outer tapered surface of said at least one of said upper and lower rails and from the surface of said at least one fixed window panel.

12. The method of claim 11, wherein said upper rail comprises said recess for receiving adhesive therein, and wherein said upper rail comprises said tapered end region at an end of said recess, and wherein said at least one notch is configured to allow excess adhesive to escape during the adhesive bonding of said upper rail to said at least one fixed window panel.

13. The method of claim 12, wherein said tapered end region comprises an aperture therethrough, and wherein said aperture is configured to allow excess adhesive to escape during the adhesive bonding of said upper rail to said at least one fixed window panel.

14. The method of claim 12, wherein said upper rail comprises a plurality of recesses, and wherein said upper rail comprises said tapered end region at an end of at least some of said recesses.

15. The method of claim 11, wherein said lower rail comprises said recess for receiving adhesive therein, and wherein said lower rail comprises said tapered end region at an end of said recess, and wherein said at least one notch is configured to allow excess adhesive to escape during the adhesive bonding of said lower rail to said at least one fixed window panel.

16. The method of claim 15, wherein said tapered end region comprises an aperture therethrough, and wherein said aperture is configured to allow excess adhesive to escape during the adhesive bonding of said lower rail to said at least one fixed window panel.

17. The method of claim 15, wherein said lower rail comprises a plurality of recesses, and wherein said lower rail comprises said tapered end region at an end of at least some of said recesses.

18. The method of claim 15, wherein said upper rail comprises another recess for receiving adhesive therein, and wherein said upper rail comprises another tapered end region at an end of the other recess, and wherein another notch is configured to allow excess adhesive to escape during the adhesive bonding of said upper rail to said at least one fixed window panel.

19. The method of claim 11, wherein said at least one fixed window panel comprises a single fixed window panel having an opening therethrough.

20. The method of claim 11, wherein said at least one fixed window panel comprises first and second fixed window panels defining an opening therebetween.

* * * * *